2,934,412

PRILLING OF AMMONIUM NITRATE

Leonard A. Stengel, Terre Haute, Ind., assignor to Commercial Solvents Corporation, Terre Haute, Ind., a corporation of Maryland No Drawing. Application July 12, 1956
Serial No. 597,345

1 Claim. (Cl. 23—302)

My invention relates to the production of ammonium nitrate in granular form and more particularly it relates to a granular or prilled ammonium nitrate and to a process for producing same utilizing substantially anhydrous molten ammonium nitrate.

The production of ammonium nitrate in the form of spherical granules or prills by a process which involves spraying of a concentrated aqueous ammonium nitrate solution into a gaseous cooling medium maintained at a lower temperature whereby the individual droplets of ammonium nitrate solution are solidified into spherical granules is referred to generally as prilling, or prilling process, and the spherical granules are referred to as prills. The prior processes are represented typically by the process described in U.S. Patent 2,402,192. The process of this patent and all other prior prilling processes refer to spraying of a concentrated aqueous solution of ammonium nitrate into a gaseous cooling medium and the above-mentioned patent specifically warns against the use of a concentrated aqueous solution of ammonium nitrate having a concentration greater than about 97% due to the fact that the prills formed from a concentrated solution in excess of 97% contain a large central void in the particle which makes the particles less satisfactory for normal use. Furthermore, the prior processes ordinarily require the use of exceptionally high towers in order to obtain solidified ammonium nitrate particles at the base thereof when using air as the gaseous cooling medium, the air being at ambient temperature. U.S. Patent 2,402,192 mentioned the use of a tower 55 feet high but it should be noted that when using this tower, the patentees employed refrigerated air as the gaseous cooling medium. Ordinarily, towers commercially employed range from about 150 to 200 feet in height. Thus the prior processes require exceptionally high towers to produce ammonium nitrate prills and furthermore the prills obtained according to the prior processes contain considerable quantities of moisture and must be dried following formation thereof in order to obtain the substantially anhydrous product necessitated by the extreme hygroscopicity of ammonium nitrate and its tendency to cake upon storage.

I have now discovered a process for prilling ammonium nitrate whereby I employ substantially anhydrous molten ammonium nitrate rather than a concentrated aqueous solution thereof and I obtain a product having a particle density and a bulk density higher than any of the products obtained by means of the prior processes in which concentrated aqueous solutions of ammonium nitrate are employed. Furthermore, by employing my new process, I am able to obtain my product using a prilling tower of vastly reduced height from those towers employed in the prior processes.

My new process consists essentially of the spraying of molten substantially anhydrous ammonium nitrate into a gaseous cooling medium and collecting the solid spherical granules or prills of ammonium nitrate. By substantially anhydrous molten ammonium nitrate I mean ammonium nitrate containing not in excess of about 0.5% moisture.

Obviously, the object of my process is to obtain solid, spherical granules or prills of ammonium nitrate starting with a molten substantially anhydrous ammonium nitrate material. The variable factors affecting the attainment of this object include tower height, temperature and amount of gaseous cooling medium employed as well as the temperature of the substantially anhydrous molten ammonium nitrate starting material. Obviously these factors must be balanced for optimum results but they can be balanced in different ways, for example, if refrigerated air in very large amounts is employed as the gaseous cooling medium the tower height can be relatively small for a given temperature of substantially anhydrous molten ammonium nitrate. On the other hand, using air at ambient temperature as the gaseous cooling medium and in moderate amounts such that entrainment of ammonium nitrate is avoided, the tower height would of necessity be higher than that required when refrigerated air is employed.

In carrying out my process, I can employ molten substantially anhydrous ammonium nitrate obtained by any convenient means. However, I prefer to obtain the substantially anhydrous molten ammonium nitrate according to the process of U.S. Patent 2,568,901 by L. A. Stengel. When employing this process for producing substantially anhydrous molten ammonium nitrate and by the time the ammonium nitrate reaches the top of the prilling tower where it is sprayed into the gaseous cooling medium, the temperature of the substantially anhydrous molten ammonium nitrate is ordinarily about 400° F. However, since the melting point of substantially anhydrous ammonium nitrate is about 340° F., it is not necessary to spray the molten substantially anhydrous ammonium nitrate at a temperature so high above the melting point. The essential requirement is that the molten ammonium nitrate be fluid and at a temperature high enough above the melting point so that it can be sprayed completely without formation of a solid crust in or around the spraying nozzle. I employ a temperature of at least about 350° F. and preferably between 355 and 360° F. for the substantially anhydrous molten ammonium nitrate.

The most economical gaseous cooling medium into which the molten substantially anhydrous ammonium nitrate can be sprayed is air at atmospheric temperature and I prefer to employ this gaseous cooling medium in my process. The amount of air which I employ is limited by entrainment losses as well as power requirements for furnishing an efficient amount. I have found that if I employ air at a tower velocity of about 700 feet per minute, the loss of ammonium nitrate by entrainment therein is within practical limits. However, if the amount of air employed is such that the air has a tower velocity above about 700 feet per minute, the loss by entrainment of ammonium nitrate is excessively high. I prefer to employ an amount of air such that the tower velocity is less than about 650 feet per minute.

As indicated above, an important variable in my new prilling process is the temperature of the gaseous cooling medium. As mentioned above, I prefer to employ air at atmospheric temperature since this is the most economical gaseous cooling medium which can be employed. However, as shown in U.S. Patent 2,402,192, refrigerated air can be employed in my new process and if it is so employed, the required height of the prilling tower can be reduced.

The required tower height in conducting a prilling process is also affected by the desired temperature of the ammonium nitrate prills which are the product. In referring to tower height I mean the distance the ammonium nitrate falls in the tower. Obviously, the ammonium nitrate droplets in the tower can be solidified by merely reducing the temperature below the melting point, but such particles are extremely pliable and have a tendency to cake badly. If the temperature of the spherical granules of ammonium nitrate is reduced to within the range 225 to 280° F., the exterior of the granules is somewhat tacky. In view of these considerations, I can reduce the temperature of the ammonium nitrate particles in the tower to a temperature below 200° F. in order to obtain solid granular particles of ammonium nitrate at the base of the tower which are relatively free flowing, the exterior of the particles being nontacky and the particles themselves being firm and not pliable. Thus employing molten substantially anhydrous ammonium nitrate at a temperature of about 400° F., air as the gaseous cooling medium at atmospheric temperature, i.e. about 70° F. and employing air at a tower velocity of about 625 feet per minute, I can obtain ammonium nitrate prills having a temperature at the base of the tower of about 195° F. using a tower having a height of only about 50 feet. I can, of course, produce prills having a temperature up to about 280° F. but in such event, I prefer to keep the prills in motion such as, for example, on a vibrating conveyor and immediately remove them from the prilling tower and cool them below 200° F. to any desired temperature. Under such conditions I need employ a tower having a height of only about 25 feet.

As mentioned above, the ammonium nitrate product which I obtain according to my new process has an exceptionally high particle density and an exceptionally high bulk density. I have found that the particle density of my new product ranges generally from about 1.5 to 1.65 grams per cc. while the bulk density of my new product ranges from about 0.9 to 1.0 gram per cc.

I have also found in the operation of my new process that the product obtained is of relatively uniform size. The size of the ammonium nitrate granules or prills obtained necessarily depends upon the orifice size in the spray nozzle through which the molten substantially anhydrous ammonium nitrate is sprayed into the gaseous cooling medium. However, I have found that employing any given orifice size, the final product is of relatively uniform size. For example, employing an orifice opening of 0.037 inch in the spray nozzle, I obtain a product such that about 80% of the granules will pass through a 10 mesh screen and be retained on a 14 mesh screen. Furthermore, I have found that when employing an orifice size of 0.025 inch in the spray nozzle, I obtain a product of a particle size such that about 95% of the granules will pass through a 10 mesh screen and be retained on a 20 mesh screen. Thus the ammonium nitrate prills obtained by my process can be characterized by the fact that they are substantially anhydrous, have high particle and bulk densities, and are of uniform size.

The following example is offered to illustrate my invention, however, I do not intend to be limited to the specific materials, proportions, or procedure employed. Rather, I intend to include within the scope of my invention all equivalents obvious to those skilled in the art.

EXAMPLE I

A series of runs was made using a prilling tower 15 inches in diameter and 50 feet high (actual drop of ammonium nitrate), the prilling tower being raised off the ground so that air could enter at the bottom. The air was drawn into the bottom of the prilling tower and withdrawn from the tower through 23 air outlet slots one inch wide and 8 inches long spaced one-inch apart around the circumference of the prilling tower at a distance of about 5 feet from the top of the tower. An air ring surrounded the tower at the position of the slots and the air was withdrawn through the slots into the air ring and then to an exhaust blower. The substantially anhydrous molten ammonium nitrate was sprayed into the tower at gauge pressures up to about 1.0 p.s.i. through nozzles having varying orifice sizes as shown below. Air was employed at atmospheric temperature and in the amount shown in the table below. The moisture content, particle density, bulk density, and screen analysis of the product are all shown in the following table which shows the results of the various runs carried out.

Table I

| Run No | 88-B | 91-E | 100-B |
|---|---|---|---|
| Orifice Size, In | 0.025 | 0.035 | 0.037 |
| Ammonium Nitrate: | | | |
| Inlet Temp., ° F | 382 | 395 | 400 |
| Air Temp., ° F | 79 | | 70.0 |
| Air Velocity, ft./min | 649 | 553.7 | 627.6 |
| Product Temp., ° F | 185 | 195 | 195 |
| Product Moisture, Percent | 0.3 | 0.15 | 0.07 |
| Particle Density, g./cc | 1.643 | 1.613 | 1.586 |
| Bulk Density, g./cc | 0.924 | 0.934 | 0.971 |
| Screen Analysis, Percent by Wt.: | | | |
| +8 mesh | 0 | 4.2 | 1.0 |
| −8+10 mesh | 0 | 7.2 | 7.6 |
| −10+14 mesh | 43.9 | 85.0 | 86.7 |
| −14+20 mesh | 54.4 | 3.2 | 3.9 |
| −20 mesh | 1.7 | 0.4 | 0.8 |

EXAMPLE II

A run was made using a prilling tower 15 inches in diameter and 25 feet high (actual drop), the tower being similar to that described in Example I. The substantially anhydrous molten ammonium nitrate was sprayed into the tower at a temperature of about 355° F. Air was employed at atmospheric temperature (80° F.) and a velocity of about 700 ft. per minute. The product had a moisture content of about 0.2% and a temperature of about 272° F. The product prills were deposited on a vibrating conveyor and removed to a cooler where they were cooled to a temperature of about 150° F. The bulk density of the product was about 0.95 gram/cc. and the particle density was about 1.64 grams/cc.

The average particle density and bulk density of the products of four different manufacturers, which products were obtained by the prior art process employing a concentrated aqueous solution of ammonium nitrate, were 1.337 and 0.773 gram/cc., respectively. These values compare with a particle density ranging from about 1.5 to 1.65 grams/cc. and a bulk density ranging from about 0.9 to 1.0 gram/cc. for the product obtained by my new process.

Now having described my invention, what I claim is:

In the process of preparing ammonium nitrate prills from molten ammonium nitrate with a moisture content not exceeding 0.5%, by spraying the molten ammonium nitrate in droplet form downwardly into a cooling gas, the improvement which consists in spraying the ammonium nitrate at low pressure through orifice openings substantially in the range of about 0.037 inch in diameter into said gas, and then recovering the resulting prills, said pressure and orifice size being so correlated as to produce free flowing prills characterized by a particle density from about 1.5 to 1.65 grams per cc. and mainly in the range of −10 +20 mesh.

References Cited in the file of this patent

UNITED STATES PATENTS

| | | |
|---|---|---|
| 478,067 | Penniman | June 28, 1892 |
| 1,613,334 | Symmes | Jan. 4, 1927 |
| 2,382,298 | Datin | Aug. 14, 1945 |
| 2,568,901 | Stengel | Sept. 25, 1951 |
| 2,643,180 | Miller | June 23, 1953 |
| 2,739,037 | Stengel | Mar. 20, 1956 |
| 2,774,660 | Cook et al. | Dec. 18, 1956 |
| 2,782,108 | Antle | Feb. 19, 1957 |
| 2,792,288 | Gordon | May 14, 1957 |
| 2,798,301 | Antle | July 9, 1957 |

FOREIGN PATENTS

| | | |
|---|---|---|
| 247,228 | Great Britain | Apr. 7, 1927 |

OTHER REFERENCES

Ind. and Eng. Chem., vol. 46, No. 4, pages 622–632, April 1954, Hester et al.